(12) United States Patent
Boutami et al.

(10) Patent No.: US 11,002,664 B2
(45) Date of Patent: May 11, 2021

(54) ABSORPTION CAVITY WITH ENTRANCE AND EXIT WAVEGUIDES FOR A CHEMICAL OR BIOLOGICAL SENSOR

(71) Applicant: COMMISSARIAT A L'ENERGIE ATOMIQUE ET AUX ENERGIES ALTERNATIVES, Paris (FR)

(72) Inventors: Salim Boutami, Grenoble (FR); Mathieu Dupoy, Coublevie (FR); Boris Taurel, Montbonnot-Saint-Martin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/322,254
(22) PCT Filed: Aug. 3, 2017
(86) PCT No.: PCT/FR2017/052174
§ 371 (c)(1),
(2) Date: Jan. 31, 2019
(87) PCT Pub. No.: WO2018/024991
PCT Pub. Date: Feb. 8, 2018

(65) Prior Publication Data
US 2019/0195779 A1    Jun. 27, 2019

(30) Foreign Application Priority Data
Aug. 4, 2016 (FR) ...................................... 1657567

(51) Int. Cl.
| *G01N 21/01* | (2006.01) |
|---|---|
| *G01N 21/3504* | (2014.01) |
| *G01N 21/03* | (2006.01) |

(52) U.S. Cl.
CPC ........... *G01N 21/01* (2013.01); *G01N 21/031* (2013.01); *G01N 21/3504* (2013.01); *G01N 2021/0378* (2013.01); *G01N 2201/08* (2013.01)

(58) Field of Classification Search
CPC ....... G01N 21/3504; G01N 2021/0378; G01N 21/01; G01N 21/031; G01N 2201/08
(Continued)

(56) References Cited

U.S. PATENT DOCUMENTS

| 2007/0085023 A1* | 4/2007 | Debroche | .......... G01N 15/1456 250/458.1 |
|---|---|---|---|
| 2007/0103680 A1* | 5/2007 | De Vandiere | ............. G01J 3/02 356/301 |

(Continued)

FOREIGN PATENT DOCUMENTS

| DE | 102 16 047 A1 | 10/2003 |
|---|---|---|
| DE | 10 2004 010 757 A1 | 9/2005 |

(Continued)

OTHER PUBLICATIONS

International Search Report dated Nov. 8, 2017 in PCT/FR2017/052174, filed on Aug. 3, 2017.
(Continued)

*Primary Examiner* — Tri T Ton
(74) *Attorney, Agent, or Firm* — Oblon, McClelland, Maier & Neustadt, L.L.P.

(57) ABSTRACT

An optical device for a biological or chemical sensor includes: an absorption cavity configured to receive a biological or chemical medium; an injection waveguide to inject an analysis light beam into the absorption cavity; and an extraction waveguide to extract a measurement light beam, corresponding to the analysis light beam after transit through the absorption cavity. The absorption cavity has a shape of a right cylinder with an elliptical base. One end of the injection waveguide is placed at a first focus of the ellipse and one and of the extraction waveguide is placed at a second focus of the ellipse. A core of the injection waveguide and a core of the extraction waveguide each have a tip-shaped end, with a constant height in a plane parallel to the generatrix of the right cylinder and a tip-shaped cross section in planes parallel to the base of the right cylinder.

14 Claims, 4 Drawing Sheets

(58) Field of Classification Search
USPC .................. 356/426–428, 432–444, 244–246
See application file for complete search history.

(56) References Cited

U.S. PATENT DOCUMENTS

| | | |
|---|---|---|
| 2014/0054460 A1 | 2/2014 | Gidon |
| 2015/0192513 A1 | 7/2015 | Nicoletti et al. |
| 2015/0359595 A1* | 12/2015 | Ben Oren ........ A61B 17/32072 |
| | | 606/15 |

FOREIGN PATENT DOCUMENTS

| | | |
|---|---|---|
| EP | 2 891 876 A1 | 7/2015 |
| FR | 2 974 423 A1 | 10/2012 |
| JP | 63-304137 A | 12/1988 |
| WO | WO 2016/118431 A1 | 7/2016 |

OTHER PUBLICATIONS

French Preliminary Search Report dated Apr. 12, 2017 in FR 1657567, filed on Aug. 4, 2016.

* cited by examiner

ABSORPTION CAVITY WITH ENTRANCE AND EXIT WAVEGUIDES FOR A CHEMICAL OR BIOLOGICAL SENSOR

TECHNICAL FIELD

The invention relates to the field of biological or chemical sensors, in particular gas concentration sensors.

The invention more specifically relates to sensors comprising a cavity intended to receive a biological or chemical medium, in which an analysis beam is partially absorbed.

PRIOR ART

Chemical sensors of gas sensor type, comprising a so-called absorption cavity, of which the inner walls are provided with a reflective coating, are known from the prior art.

The absorption cavity has openings on the outside, such that it is filled with the surrounding gaseous medium.

Inside the absorption cavity there is a light source, for the emission of a so-called analysis light beam, and a photo-detector, for the detection of a measurement beam corresponding to the analysis beam after partial absorption by the gas inside the cavity.

The absorption cavity has for example an ellipse shape, with the light source placed at a first focus of the ellipse, and the photo-detector placed at a second focus of the ellipse. The analysis beam emitted by the light source propagates in the cavity, reflects on a reflecting wall of said cavity, and returns to the photo-detector. The analysis beam thereby makes two passages in the cavity.

It is then possible to calculate a level of absorption at a wavelength characteristic of a predetermined gas, to obtain a concentration of said gas in the cavity, and thus in the surrounding gaseous medium.

The concentration measurement uses the Beer-Lambert law:

$$I(r) = I_0 e^{-\alpha r} \quad (1)$$

with:
r the distance covered by the analysis beam in the cavity;
α the coefficient of absorption of the predetermined gas, coefficient linked to the nature of the gas present and its concentration;
$I_0$ the light intensity of the analysis beam, emitted by the light source; and
I(r) the light intensity of the measurement beam, measured by the photo-detector.
The variation in light intensity $$\frac{I(r)}{I_0}$$

thus makes it possible to measure a gas concentration.

In order to increase measurement sensitivity, one solution consists in increasing the distance r covered by the analysis beam in the cavity.

The document EP 2 891 876 describes for example an absorption cavity constituted of a flat mirror and a spherical mirror. By positioning the light source on the spherical mirror, and the photo-detector on the flat mirror, a gas sensor is obtained in which the analysis beam makes three crossings of the cavity before being received by the photo-detector.

An objective of the present invention is to propose an optical device with absorption cavity, for a chemical or biological sensor such as a gas sensor, making it possible to further increase the sensitivity of the sensor.

DESCRIPTION OF THE INVENTION

This objective is attained with an optical device for a chemical or biological sensor, comprising an absorption cavity, the absorption cavity having reflective inner walls and being intended to receive a chemical or biological medium.

According to the invention, the optical device further comprises:
  a so-called injection waveguide, extending outside the absorption cavity and arranged for the injection of an analysis light beam inside the absorption cavity; and
  a so-called extraction waveguide, extending outside the absorption cavity and arranged for the extraction of a so-called measurement light beam, coming from inside the absorption cavity.

The measurement beam corresponds to the analysis beam at the exit of the absorption cavity, that is to say after it has transited through the absorption cavity.

Thus, in a chemical or biological sensor comprising such an optical device, the light source emitting the analysis beam is shifted to the outside of the cavity.

In the same way, the photo-detector is shifted to the outside of the cavity.

In this way, one is freed of the constraints linked to the integration of a component inside a cavity of reduced volume.

The invention thus makes it possible to simplify the integration of the light source and the photo-detector in a sensor with absorption cavity.

This simplified integration may make it possible to improve the precision of positioning and alignment of the light source and the photo-detector, and thus to improve the sensitivity of said sensor.

The invention also makes it possible to exploit the possibilities of guided optics to treat the analysis beam before its entrance into the absorption cavity and/or the measurement beam exiting the absorption cavity (spectral filtering, routing, etc.).

It is thereby possible to improve the signal to noise ratio of the measurement beam. Thus, it is possible to further improve the sensitivity of a sensor with absorption cavity.

The invention is particularly ingenious in that it overcomes the prejudices of those skilled in the art by proposing a novel way for improving sensitivity not relying on a novel shape of the absorption cavity.

Preferably, the absorption cavity has a right cylinder shape, with an ellipse portion shaped base, one end of the injection waveguide being arranged at a first focus of the ellipse and one end of the extraction waveguide being arranged at a second focus of the ellipse.

The core of the injection waveguide and the core of the extraction waveguide may each have a tip shaped end (or point shaped end), on the absorption cavity side.

Advantageously, the core of the injection waveguide and the core of the extraction waveguide each have a constant height, in a plane parallel to the generatrix of the right cylinder, and a tip shaped section, in planes parallel to the base of the right cylinder.

Preferably, the injection waveguide and the extraction waveguide each have:
  a main cladding, having a tapered or slimmed end, on the absorption cavity side;

a core, having a tip shaped end, on the absorption cavity side which protrudes out of the main cladding; and an adaptation region, surrounding the slimmed end of the main cladding and the tip shaped end of the core.

Each adaptation region may be formed by at least one secondary cavity, open on the absorbent cavity.

Advantageously, a central axis of the injection waveguide and a central axis of the extraction waveguide each extend in a straight line, each inclined by a respective non-zero angle relative to a symmetry plane of the absorption cavity.

Said non-zero angle is substantially equal in absolute value to:

$$\theta_i = \sin^{-1}\left(\frac{n_c * \Delta x}{n_i * \sqrt{\Delta x^2 + b^2}}\right)$$

with:

$n_c$ the refractive index inside the absorption cavity;

$n_i$ the effective index of the guided mode in the injection waveguide, respectively the absorption waveguide, at the end of said waveguide situated on the absorption cavity side;

$\Delta x$ the distance between the centre of said waveguide, at its end situated on the absorption cavity side, and the centre of the ellipse; and b the distance between the centre of the ellipse and the bottom of the absorption cavity, on the side opposite to the injection and extraction waveguides.

Preferably, the injection waveguide and the extraction waveguide are symmetrical with each other, relative to a symmetry plane of the absorption cavity.

The distance between the respective centres of the injection waveguide and the extraction waveguide, at their respective ends situated on the absorption cavity side, is advantageously greater than 5 µm.

Preferably, the dimensions and refractive indices of the injection waveguide and the extraction waveguide, and the distance between the respective centres of the injection waveguide and the extraction waveguide, at their respective ends situated on the absorption cavity side, are adapted so that a guided mode at the exit of the injection waveguide does not interfere with a guided mode at the entrance of the extraction waveguide.

According to an advantageous alternative, the injection waveguide and the extraction waveguide are connected together by a so-called loopback waveguide, the injection waveguide, the extraction waveguide and the loopback waveguide being formed together in a single piece.

According to this alternative, the device may further comprise a so-called main waveguide, extending parallel to a tangent to the loopback waveguide, for the transfer of the analysis light beam from the main waveguide to the loopback waveguide, and the transfer of the measurement light beam from the loopback waveguide to the main waveguide, by evanescent coupling.

The loopback waveguide may extend to the rear of the absorption cavity, on the side opposite to a side receiving the respective ends of the injection waveguide and the extraction waveguide.

The invention also relates to a chemical or biological sensor, comprising:

an optical device according to the invention;

a light source, for the emission of the analysis light beam; and a photo-detector, for the reception of the measurement light beam.

BRIEF DESCRIPTION OF THE DRAWINGS

The present invention will be better understood on reading the description of exemplary embodiments given purely for indicative purposes and in no way limiting, while referring to the appended drawings in which.

DETAILED DESCRIPTION OF PARTICULAR EMBODIMENTS

Figure 1A:
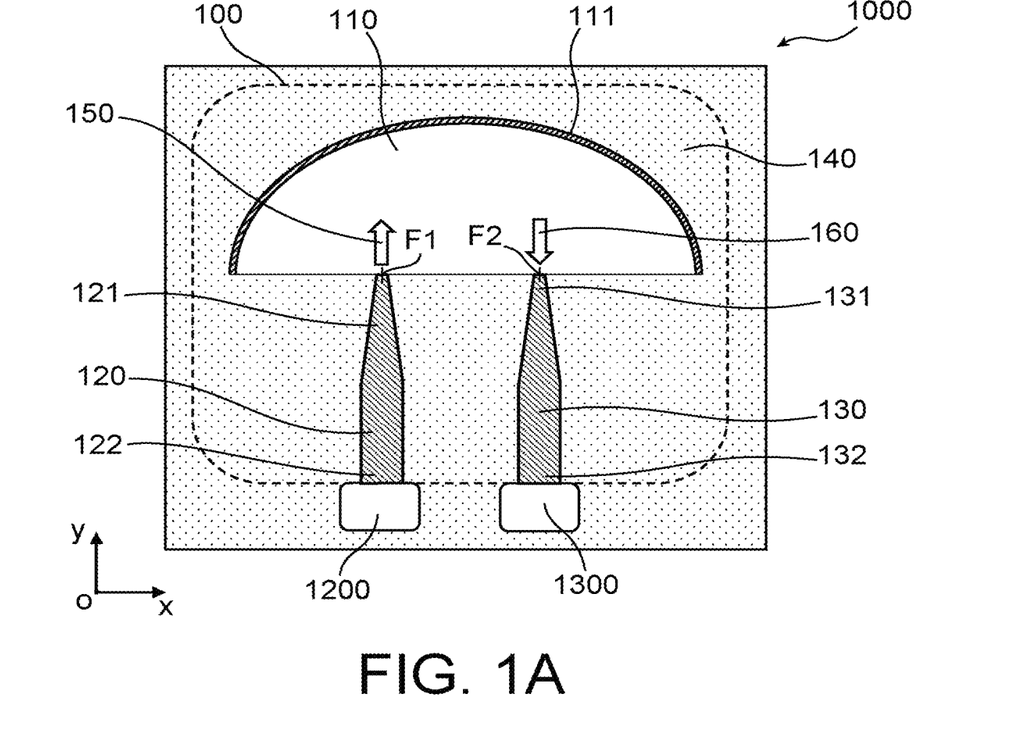
FIGS. 1A and 1B illustrate in a schematic manner a first embodiment of an optical device and a chemical or biological sensor according to the invention, according to two sectional views.
Figure 1B:
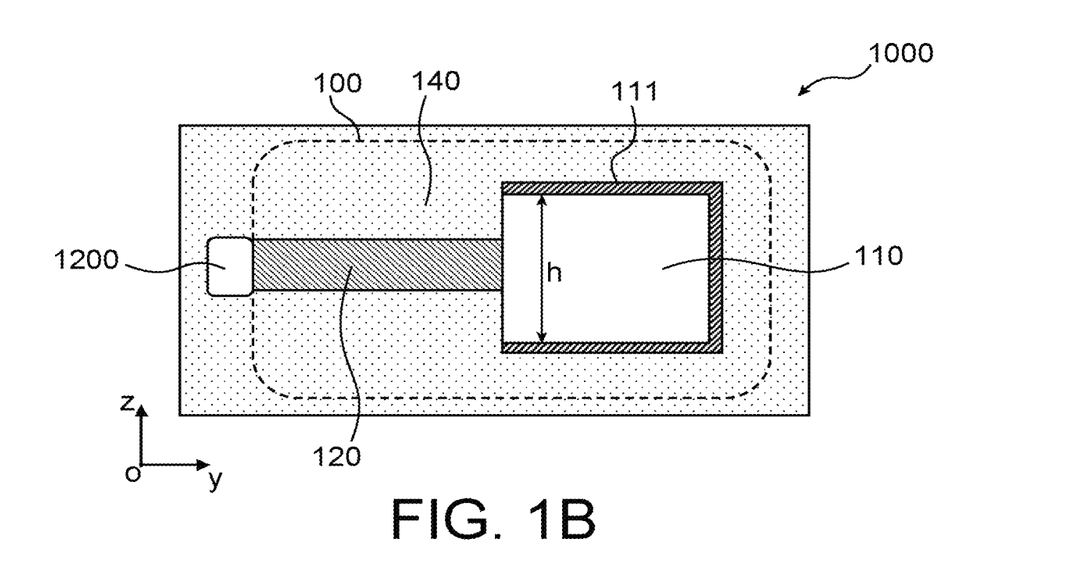

A first embodiment of an optical device 100 and a chemical or biological sensor 1000 according to the invention will firstly be described, with reference to FIGS. 1A and 1B.

FIG. 1A is a sectional view, in the plane (xOy) of an orthonormal coordinate system.

FIG. 1B is a sectional view, in the plane (yOz) of said coordinate system.

It may be considered that FIG. 1A is a top view in transparency, and FIG. 1B a side view in transparency.

The optical device 100 comprises an absorption cavity 110, an injection waveguide 120 and an extraction waveguide 130.

In practice, the optical device 100 is advantageously formed in a substrate 140, for example a silicon substrate.

The absorption cavity 110 is intended to receive a gaseous or even liquid medium, which is going to absorb in part an analysis light beam, the absorption being characteristic of a chemical or biological element and the concentration of said element.

The absorption cavity 110 here has a right cylinder shape, of which the base is a half-ellipse.

The base is parallel to the plane (xOy) (see FIG. 1A).

The generatrix of the cylinder is parallel to the axis (Oz).

The height h of the cavity is thus measured along this axis (Oz).

Hereafter, but in a non-limiting manner, attention will be given more specifically to this shape of absorption cavity.

The inner walls of the absorption cavity 110 are covered at least partially by a reflective coating 111, here a thin gold layer. The reflective coating 111 extends in particular onto an upper flat wall, a lower flat wall, and a rounded side wall of the cavity 110.

The injection waveguide 120 is configured to guide an analysis beam 150 from the outside of the absorption cavity 110, up to the entrance thereof.

In particular, the injection waveguide 120 has a first end 121 arranged at a first focus F1 of the ellipse defining the absorption cavity. In particular, the centre of the injection waveguide 120, at its end situated on the absorption cavity 110 side, coincides with the focus F1.

The injection waveguide 120 here extends entirely outside the absorption cavity 110.

The height of the injection waveguide 120 is less than that of the absorption cavity (dimension along the axis (Oz)), for example at least two times less.

The extraction waveguide 130 is configured to guide a measurement beam 160 up to the outside of the absorption cavity 110.

In particular, the extraction waveguide 130 has a first end 131 arranged at a second focus F2 of the ellipse defining the absorption cavity. In particular, the centre of the extraction waveguide 130, at its end situated on the absorption cavity 110 side, coincides with the focus F2.

The extraction waveguide 130 here extends entirely outside the absorption cavity 110.

The height of the extraction waveguide 130 is less than that of the absorption cavity, for example at least two times less.

The chemical or biological sensor 1000 comprises the optical device 100, a light source 1200 and a photo-detector 1300.

The light source 1200 is here arranged at a second end 122 of the injection waveguide 120.

It is preferably a quantum cascade laser (QCL) source, or a bar of several QCLs. In an alternative, it may be a non-dispersive infrared (NDIR) source in guided configuration (and not in free space).

The light source 1200 emits the analysis beam 150, which propagates in the injection waveguide up to the entrance in the absorption cavity 110.

The analysis beam 150 traverses the absorption cavity a first time starting from the first focus F1 of the ellipse, reflects on the reflective coating 111 inside the absorption cavity, and traverses the absorption cavity a second time until reaching the second focus F2 of the ellipse and entering into the extraction waveguide 130.

In the course of these two crossings of the absorption cavity, the analysis beam is partially absorbed by the gaseous or liquid medium filling the absorption cavity.

"Measurement beam" 160 designates the analysis beam at its exit from the absorption cavity, at the entrance of the extraction waveguide, here at the second focus F2 of the ellipse.

The photo-detector 1300 is here arranged at a second end 132 of the extraction waveguide 130.

It is for example an infrared detector, of bolometric or pyroelectric, or thermopile type.

It receives the measurement beam 160, which has propagated in the extraction waveguide 130 after having left the absorption cavity 110.

It may thus be seen that the optical device according to the invention enables that the light source to emit the analysis beam and the photo-detector to receive the measurement beam are placed on the outside of the absorption cavity. Their integration is thus facilitated.

The central wavelength of the analysis beam depends on the nature of the chemical or biological species to detect.

The materials constituting the injection waveguide 120 and the extraction waveguide 130 are adapted to said central wavelength.

For example, for an analysis beam in the mid-infrared (wavelengths comprised between 3 µm and 15 µm), the injection 120 and extraction 130 waveguides preferably comprise a core made of germanium, or an alloy of silicon and germanium, and a cladding made of silicon, or an alloy of silicon and germanium.

For an analysis beam in the near infrared (wavelengths comprised between 1 µm and 3 µm), the injection 120 and extraction 130 waveguides preferably comprise a silicon (Si) core and a silica ($SiO_2$) cladding.

For an analysis beam in the visible (wavelengths less than 1 µm, in particular comprised between 0.4 µm and 0.8 µm), the injection 120 and extraction 130 waveguides preferably comprise a silicon nitride ($Si_3N_4$) core and a silica ($SiO_2$) cladding. An analysis beam in the visible may be used to detect a biological species, preferably in a liquid medium, or for the detection of particles.

Advantageously, but in a non-limiting manner, the light source 1200 is integrated in a same substrate as the optical device 100.

The light source 1200 is for example a heat source such as described in the patent application FR 2 974 423, emitting an infrared radiation.

In an alternative, the light source 1200 may be a quantum cascade laser source.

In the same way, the photo-detector 1300 is advantageously integrated in a same substrate as the optical device 100.

Figure 2:
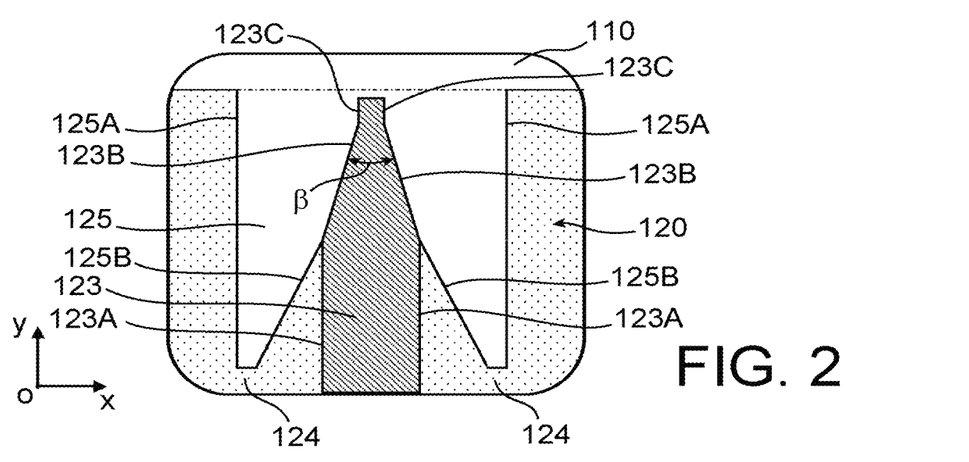
FIG. 2 illustrates in a schematic manner a detail of an injection waveguide, respectively an extraction waveguide, according to the embodiment represented in FIGS. 1A and 1B.

FIG. 2 illustrates in a schematic manner a detail of the injection waveguide 120, on the absorption cavity 110 side.

The extraction waveguide 130 has the same structure.

The injection waveguide 120 comprises a core 123, and a so-called main cladding 124 here constituted of a portion of the substrate 140 (see FIG. 1A).

The end of the injection waveguide 120 situated on the absorption cavity side is said to be a tip end. In other words, this end is slimmed down, or tapered, on the absorption cavity side.

In particular, the core 123 has the form of a tip.

A right cylinder 110 of which the base has the shape of a half-ellipse has been defined, with reference to FIGS. 1A and 1B.

Along the generatrix of this cylinder, the core 123 has a constant height.

In the planes parallel to the base of this cylinder, the core has a shaped defined by:
two first walls 123A parallel with each other; and
two second walls 123B inclined with each other by an angle β, together forming a tip directed towards the inside of the absorption cavity 110.

Here, the end of the tip has a square or rectangular section, defined by two third walls 123C parallel with each other, of which the spacing corresponds to the minimum spacing of the two second walls 123B.

This end with square or rectangular section enables better control of the minimum width of the core 123.

The injection waveguide 120 also has a so-called adaptation region 125.

The adaptation region 125 also has a constant height along the generatrix of the cylinder.

In the planes parallel to the base of this cylinder, the adaptation region 125 surrounds a decreasing width of the cladding 124, then surrounds the tip shaped walls 123B and 123C of the core 123, while being in direct physical contact therewith.

Thus, on either side of the core 123, the adaptation region 125 has a section of which the width increases progressively on coming closer to the absorption cavity 110, such that the width of the cladding 124 decreases progressively until disappearing entirely, then the width of the core decreases progressively until reaching a final width.

The adaptation region 125 is defined notably by:
two first walls 125A parallel with each other, defining the outer limits of the adaptation region;
two second walls 125B inclined with each other, and defining the portion of cladding 124 of which the width decreases on coming closer to the absorption cavity 110; and
walls that extend parallel to the walls 123B and 123C of the core, in direct physical contact therewith, at the spot where the absorption region 125 directly surrounds the tip end of the core 123.

The refractive index of the adaptation region 125 is less than the refractive index of the cladding 124, and thus a fortiori than the refractive index of the core 123.

The tip end of the injection waveguide 120 thus leads to a progressive decrease in the effective index of the mode guided by the injection waveguide, on coming closer to the absorption cavity 110.

Consequently, the shape of said guided mode is modified progressively, on coming closer to the absorption cavity 110.

In particular, the vertical dimension of said guided mode, along an axis parallel to the generatrix of the cylinder, increases progressively.

At the exit from the injection waveguide 120, the vertical dimension of the guided mode in said waveguide is substantially equal to the height of the cavity, that is to say to the vertical dimension of the fundamental mode of the cavity.

In particular, the ratio between the vertical dimension of the guided mode in the waveguide and the height of the absorption cavity is for example comprised between 0.75 and 1.25.

An adaptation of the vertical mode size is thus carried out (where vertical is the generatrix of the right cylinder), between the fundamental mode of the absorption cavity 110 and the guided mode in the injection waveguide.

The extraction waveguide 130 carries out, in the same way, an adaptation of vertical mode size, between the fundamental mode of the absorption cavity 110 and the guided mode in the extraction waveguide. In particular, at the entrance in the extraction waveguide 130, the vertical dimension of the guided mode in said waveguide is substantially equal to the vertical dimension of the fundamental mode of the cavity, and decreases progressively on moving away from the absorption cavity.

In this way one is freed of the drawbacks linked to the divergence of the analysis beam inside the absorption cavity, in planes parallel to the generatrix of the cylinder.

The mode adaptation is not necessary in the planes parallel to the base of the cylinder, since in these planes the elliptical shape of the absorption cavity 110 ensures the convergence of the light rays from the injection waveguide to the extraction waveguide.

Preferably, the adaptation region 125 is constituted of at least one housing, or excavation, or secondary cavity, hollowed out in the substrate, and opening onto the absorption cavity 110.

Said housing is thus filled with the same gaseous or liquid medium as the absorption cavity 110, which makes it possible to optimise the mode adaptation between the injection and extraction waveguides, and the absorption cavity.

In this case, no anti-reflective coating is necessary on the tip ends of the waveguides.

The adaptation region 125 is formed more specifically by two housings, arranged on either side of the core 123.

It may be recalled here that the effective index of a guided mode in a waveguide is defined in the following manner:

$$N_{eff} = \beta * \frac{\lambda}{2\pi} \qquad (2)$$

with:
$N_{eff}$ the effective index of the considered mode;
$\lambda$ the wavelength of the light beam propagating in the waveguide; and
$\beta$ the phase constant of the waveguide.

The phase constant $\beta$ depends on the wavelength and the mode of the light beam propagating in the waveguide, as well as the properties of said waveguide (in particular the refractive indices and geometry).

It may sometimes be considered that the effective index designates the mean optical index of the medium such as it is "seen" by a mode of the light beam propagating in the waveguide.

Figure 3A:
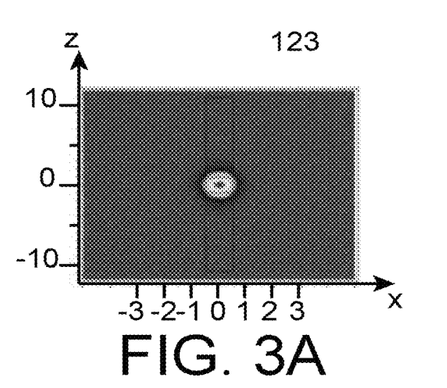
FIGS. 3A and 3B illustrate the adjustment of mode size implemented thanks to a waveguide such as represented in FIG. 2.
Figure 3B:
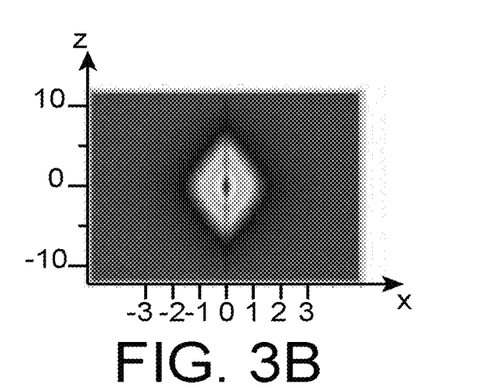

FIGS. 3A and 3B illustrate the mode adaptation implemented in the waveguide represented in FIG. 2.

The core 123 has a constant height of 3 µm, and a maximum width of 2 µm. It is made of silicon and germanium alloy, and has a refractive index equal to 3.6.

The cladding 124 is made of silicon, of refractive index equal to 3.4.

The central wavelength of the analysis beam is equal to 4.26 µm.

The absorption cavity has a height of 25 µm, defining the vertical size of the fundamental mode in said cavity.

In FIGS. 3A and 3B, the abscissa axis is graduated in µm, and corresponds to a dimension along the axis (Ox) (axis of the width of the absorbent cavity).

The ordinate axis is graduated in µm, and corresponds to a dimension along the axis (Oz) (vertical axis, or axis of the height of the absorbent cavity).

FIG. 3A represents the size of the guided mode, at a position in the injection, respectively extraction, waveguide where the width of the core 123 is 1 µm. The guided mode has a dimension along the axis (Oz) equal to around 5 µm.

FIG. 3B represents the size of the guided mode, at a position in the injection, respectively extraction, waveguide where the width of the core 123 is 0.1 µm. The guided mode has a dimension along the axis (Oz) equal to around 20 µm.

The tip shape of the end of the injection, respectively extraction, waveguide thus makes it possible to carry out a vertical mode adaptation, between the guided mode in the injection, respectively extraction, waveguide and the fundamental mode of the absorption cavity.

Figure 4:
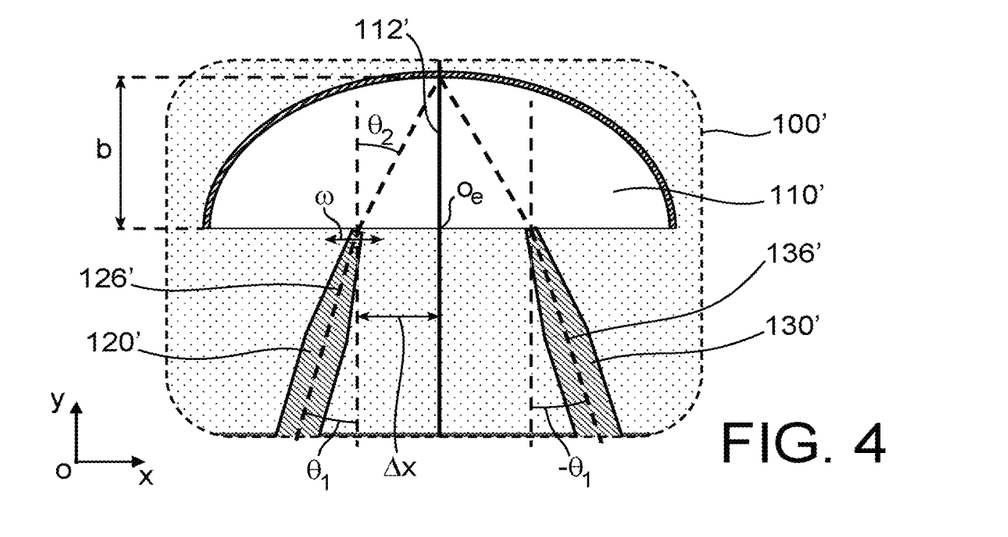
FIG. 4 illustrates in a schematic manner an alternative of the embodiment represented in FIGS. 1A and 1B.

FIG. 4 illustrates an alternative of the optical device represented in FIGS. 1A and 1B.

According to this embodiment, the central axis 126' of the injection waveguide 120' is inclined by an angle $\theta_1$ relative to a symmetry plane 112' of the absorption cavity 110'. The symmetry plane 112' is a vertical plane parallel to the axis (Oz), and passing through one among the small axis or the large axis of the ellipse, here the small axis.

The angle $\theta_1$ substantially corresponds to the incidence angle of a light beam reaching the absorption cavity 110', such that the corresponding refracted ray propagates inside the absorption cavity up to the intersection between the symmetry plane 112' and the ellipse shaped wall of said cavity.

In other words, according to Snell-Descartes laws, the angle $\theta_1$ is substantially equal to:

$$\theta_i = \sin^{-1}\left(\frac{n_c * \Delta x}{n_i * \sqrt{\Delta x^2 + b^2}}\right) \quad (3)$$

with:

$n_c$ the refractive index inside the absorption cavity;

$n_i$ the effective index of the guided mode in the injection waveguide, at the spot where the width of the core is minimal, just before the entrance in the absorption cavity;

$$\frac{\Delta x}{\sqrt{\Delta x^2 + b^2}} = \sin(\theta_2),$$

with $\theta_2$ the angle of refraction of said refracted ray;

b the distance between the centre 0e of the ellipse and the bottom of the absorption cavity, here half the length of the half-small axis of the ellipse (measured along an axis parallel to (Oy)); and $\Delta x$ the distance between the centre 0e of the ellipse and the centre of the injection waveguide at the entrance in the absorption cavity 110' (measured along an axis parallel to (Ox)).

Substantially equal is taken to mean preferably equal to more or less some 1°, or even to more or less some 2°.

Preferably, the angle $\theta_1$ is exactly equal to $\theta_i$.

In practice, the angle $\theta_1$ is for example greater than or equal to 3°, or even greater than or equal to 5° or even more, in absolute value.

Whatever the case, the angle $\theta_1$ is such that the central axis 126' of the injection waveguide is inclined towards the symmetry plane 112' of the absorption cavity.

Preferably, the injection waveguide 120' and the extraction waveguide 130' are symmetrical with each other relative to the symmetry plane 112'.

Here, this results in a central axis 136' of the extraction waveguide 130' inclined by an angle $-\theta_1$ relative to the symmetry plane 112'.

This inclination of the injection and extraction waveguides, towards the symmetry plane 112' of the absorption cavity, enables the central ray of the analysis beam to propagate from the injection waveguide to the bottom of the absorption cavity, and from the bottom of the absorption cavity to the extraction waveguide.

Coupling between the injection waveguide and the extraction waveguide is thereby improved.

In each of the embodiments according to the invention, the distance between the respective ends of the injection and extraction waveguides, on the absorption cavity side, is sufficiently high to avoid any evanescent coupling between these two guides. In other words, it involves preventing a guided mode at the exit of the injection waveguide interfering with a guided mode at the entrance of the extraction waveguide.

The smallest distance between these ends, making it possible to avoid such coupling, thus depends on the width of the guided mode at the exit of the injection waveguide, and at the entrance of the extraction waveguide. This smallest distance is thus a function of the dimensions and refractive indices at the respective ends of these two waveguides, on the absorption cavity side.

This distance is preferably measured between the centre of the injection waveguide and the centre of the extraction waveguide, at their ends situated on the absorption cavity side.

This distance is equal to $2*\Delta x$ (see FIG. 4).

Preferably $\Delta x \geq w$ is chosen, with w the width of the guided mode at the exit of the injection waveguide, respectively at the entrance of the extraction waveguide, projected on the axis (Ox).

The axis (Ox) is the axis joining the centre of the injection waveguide and the centre of the extraction waveguide, at their ends situated on the absorption cavity side.

The width of the guided mode at the exit of the injection waveguide, respectively at the entrance of the extraction waveguide, is a width at $1/e^2$ in intensity, for a Gaussian guided mode.

The width of the guided mode is preferably measured in a plane orthogonal to the central axis of the injection waveguide, respectively the extraction waveguide.

This width is measured in particular along an axis corresponding to the intersection between such a plane, and a plane parallel to the base of the cylinder (cylinder defining the shape of the absorption cavity).

In practice, when the injection and extraction waveguides are parallel with each other, it is possible to use directly the width of the guided mode at the exit of the injection waveguide, respectively at the entrance of the extraction waveguide.

This gives for example $\Delta x$ greater than or equal to 5 μm, and even greater than or equal to 10 μm.

Figure 5:
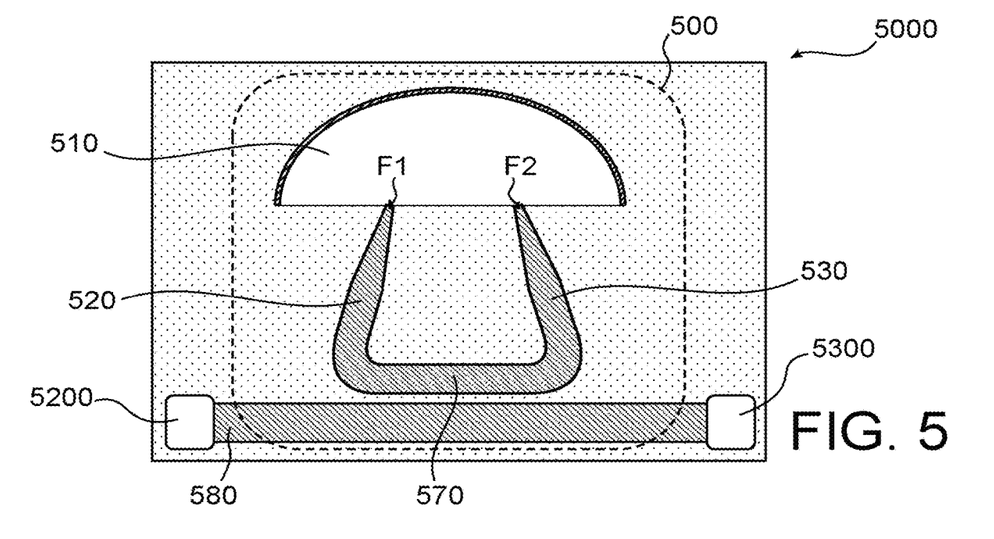
FIG. 5 illustrates in a schematic manner a second embodiment of an optical device and a chemical or biological sensor according to the invention.

FIG. 5 illustrates, in a schematic manner, a second embodiment of an optical device 500 and a chemical or biological sensor 5000 according to the invention.

According to this embodiment, the injection waveguide 520 and the extraction waveguide 530 are connected together by a so-called loopback waveguide 570.

In other words, the injection waveguide 520, the extraction waveguide 530 and the loopback waveguide 570 together form a single and same curved waveguide.

The curved waveguide and the absorption cavity are arranged together to guide the light along a looped path. It is said that they form together a loop.

Preferably, the curved waveguide is adapted so that the phase shift brought by one turn in said loop, at a wavelength of interest of the analysis beam, is a multiple of $2\pi$. In other words, said loop is resonating at a wavelength of interest of the analysis beam. This resonance is for example obtained by a suitable choice of the curvilinear length of the curved waveguide.

In the embodiment of FIG. 5, this curved waveguide extends between the first focus F1 and the second focus F2 of the ellipse, on the side opposite to the ellipse shaped wall of the resonating cavity 510.

This curved waveguide is coupled to a so-called main waveguide 580, by evanescent coupling.

In other words, a guided mode of the main waveguide interferes with a guided mode of the curved waveguide, which ends up in a transfer of energy between these two modes.

The main waveguide 580 extends here in a straight line, parallel to a tangent to the curved waveguide, in particular a tangent to the loopback waveguide 570.

Preferably, but in a non-limiting manner, there is no direct physical contact between the main waveguide 580 and the curved waveguide, the distance between these two guides being adapted to the establishment of said evanescent coupling.

In particular and advantageously, when the amount of coupling is optimised, there is no direct physical contact between the main waveguide and the curved waveguide, notably the loopback waveguide.

At a first end of the main waveguide 580 is located the light source 5200, whereas at the other end of the main waveguide 580 is located the photo-detector 5300.

In operation, the analysis beam emitted by the light source 5200 propagates in the main waveguide 580, up to a coupling point with the curved waveguide where it is at least partially transferred into the curved waveguide.

The analysis beam then makes several turns in a loop constituted of the injection waveguide 520, the absorption cavity 510, the extraction waveguide 530, and the loopback waveguide 570.

The analysis beam thereby makes several passages in the absorption cavity 510.

It next returns to the main waveguide 580, also by evanescent coupling. The analysis beam returning to the main waveguide 580 forms the measurement beam according to the invention, which propagates in the main waveguide 580 up to the photo-detector 5300.

This embodiment makes it possible to significantly increase the cumulative length of the path of the analysis beam in the absorption cavity 510, without adversely affecting the compactness of the optical device 500 and the sensor 5000 according to the invention.

The sensitivity of a chemical or biological sensor with absorption cavity can thereby be significantly increased, without adversely affecting its compactness.

The gain in sensitivity brought about by such a loopback between the injection and extraction waveguides can be measured, using an analytical model.

The transmission rate from the entrance to the exit of the main waveguide is given by:

$$\tau = 1 - \frac{K(1-\Gamma)}{1 + Z^2 - 2Z\cos\varphi} \quad (4)$$

with:

$Z=\sqrt{(1-K)\Gamma}$ the total attenuation in amplitude coefficient, linked to metallic losses of the absorption cavity, losses due to the medium inside the cavity, losses by propagation in the waveguides, and losses due to evanescent coupling between the main waveguide and the curved waveguide;

K the coupling coefficient between the main waveguide and the curved waveguide, linked to the distance between these two guides;

$\varphi$ the phase shift after one turn in the loop constituted by the curved waveguide and the absorption cavity, assumed equal to a multiple of $2\pi$; and $\Gamma$ the attenuation in intensity coefficient, for each turn in said loop (linked to metallic losses of the absorption cavity, losses due to the medium inside the cavity, and losses due to propagation in the curved waveguide).

The attenuation coefficient F has two contributions:

a contribution $\Gamma_p$ linked to losses in the curved waveguide. These losses are around 1 dB/cm, i.e. $\Gamma_p$=0.94 for an elliptical cavity of half-small axis equal to 100 µm;

a contribution linked to the cavity.

In a cavity without gas, this contribution equals:

$$\Gamma_{c0} = R^{\frac{2b\lambda}{h^2}}.$$

In the case of a cavity with gas, it is equal to: $\Gamma_{v1}= e^{-3.5.10^{-6}b*C}*\Gamma_{c0}$;

with, when the gas to detect is $CO_2$:

$\lambda$=4.26 µm, situated in the absorption range of $CO_2$,

C the concentration in gas in ppm (parts per million),

R=0.98 the coefficient of reflection of gold at $\lambda$=4.26 b=100 µm the length of the half-small axis of the ellipse defining the absorption cavity, and h=25 µm the height of the absorption cavity.

Then we have $\Gamma=\Gamma_p*\Gamma_{c1}$ or $\Gamma=r_p*\Gamma_{c0}$.

Knowing $\Gamma$, an optimum value of the coupling coefficient K, making it possible to obtain the best sensitivity, is chosen.

In particular, for different concentrations C, the transmission rate $\tau$ with gas and the transmission rate r without gas are compared, as a function of K.

In particular a peak is sought on a curve giving the difference in absolute value between the transmission rate without gas and the transmission rate with gas, as a function of K. If several peaks are identified, the one having the greatest width at mid-height is chosen, for reasons of stability.

The distance between the main waveguide and the curved waveguide is less than $\lambda$.

Here, K is chosen comprised between 0.3 and 0.5, which determines an optimum distance between the main waveguide and the curved waveguide.

The sensitivity of the sensor according to the invention having the above characteristics is then calculated, for different concentrations in $CO_2$. This sensitivity corresponds to the ratio between the light intensity measured by the photo-detector in the absence of gas, and in the presence of gas at said concentration.

This sensitivity is compared to that of a sensor according to the prior art, of which the absorption cavity has the same dimensions.

For a concentration in $CO_2$ of 10 ppm and less, the gain in sensitivity is multiplied by a factor of around 4.

Whatever the concentration in $CO_2$, the sensitivity is improved.

Figure 6:
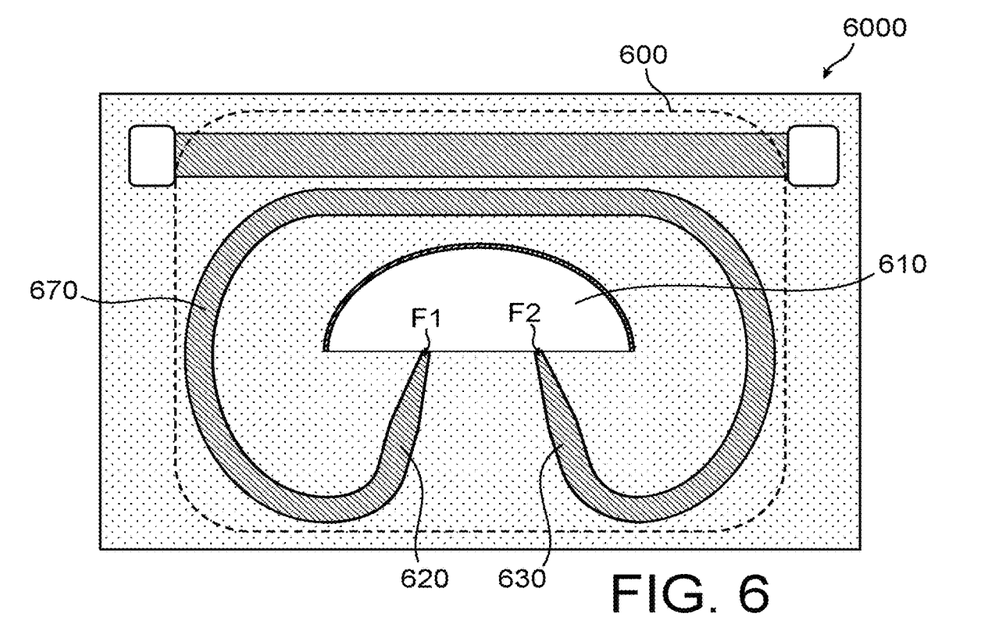
FIG. 6 illustrates in a schematic manner an alternative of the embodiment represented in FIG. 5.

FIG. 6 illustrates an advantageous alternative of the embodiment of FIG. 5.

The optical device 600 and the sensor 6000 according to this alternative only differ from the embodiment illustrated in FIG. 5 in that the injection waveguide 620, the extraction waveguide 630 and the loopback waveguide 670 together form a single and same curved waveguide, which extends between the first focus F1 and the second focus F2 of the ellipse, while passing through the rear of the cavity.

In other words, the curved waveguide surrounds in part the absorption cavity 610, while extending onto the side of the cavity 610 opposite to the side receiving the respective ends of the injection waveguide 620 and the extraction waveguide 630.

The additional advantage conferred by this alternative is a smaller curvature of the curved waveguide. In this way, optical losses in the curved waveguide are minimised, in particular losses to radiative modes.

Figure 7:
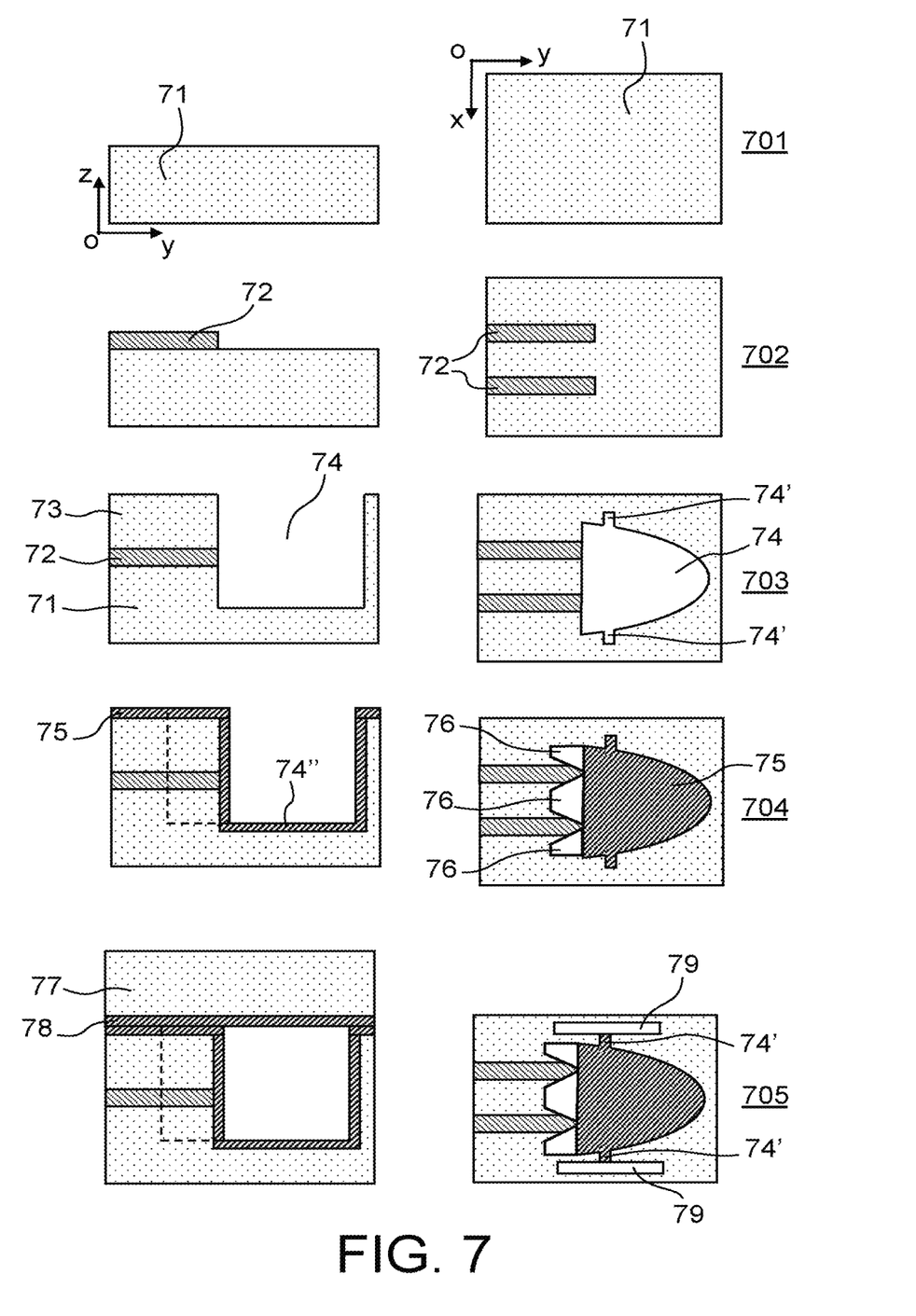
FIG. 7 illustrates in a schematic manner an example of method for producing an optical device according to the invention.

FIG. 7 illustrates in a schematic manner an example of method for manufacturing an optical device according to the invention.

The figures on the left represent the device in the course of production, according to sectional views in a plane parallel to the plane (yOz) of the coordinate system defined above.

The figures on the right represent the device in the course of production, according to sectional views in a plane parallel to the plane (xOy) of the coordinate system defined above.

The starting point is a substrate 71, here a silicon substrate (starting point 701).

In a first step 702, a layer made of silicon and germanium alloy is deposited by epitaxy on the substrate 71, then said layer is etched to form two ribbons 72. One ribbon is going to form the injection waveguide, whereas the other ribbon is going to form the extraction waveguide. The alloy comprises for example 40% germanium.

The substrate 71 and the ribbons 72 are then covered with a new silicon layer 73, deposited by epitaxy. The silicon layer 73 is advantageously planarised. The ribbons 73 are thereby encapsulated in silicon. A cavity 74 is then etched at the end of the two ribbons 72 (step 703). The cavity 74 extends over the entire thickness of the new silicon layer 73, and over a part of the thickness of the substrate 71. The cavity is represented on the right according to a top view. It has an ellipse portion shaped section, and will next form the absorption cavity according to the invention. The cavity 74 also has, on either side of its symmetry plane, fins 74'. The fins protrude outside the main ellipse shape of the cavity. They are formed on lateral regions of the cavity, on which the aforementioned analysis beam will not be incident. They will thus have no influence on the path of the analysis beam in the absorption cavity (the reason for which they are not mentioned in the above description).

In a step 704, a thin gold layer 75 is deposited, which notably covers the inner walls of the cavity 74, and secondary cavities 76 are etched around the ribbons 72, on the side of the cavity, to form the tip-ended waveguides such as described with reference to FIG. 2. It is preferably a chemical etching. The etching may over-extend notably upstream of the tips, in the cavity 74. The chemical attack substance is adapted so that the thin gold layer deposited on the lower face 74" of the cavity is not etched.

In a final step 705, on top of the cavity 74 and the ribbons 72 is transferred a stack constituted of a substrate 77 and a thin gold layer 78, then vents 79 are etched. The thin gold layer 78 is situated on the side of the cavity 74, and forms the upper wall thereof. The absorption cavity according to the invention is thereby produced. The vents 79 are openings etched through the substrate 77 and the thin gold layer 78, at the level of the fins 74', to enable a surrounding medium to penetrate inside the cavity 74.

The biological or chemical sensor according to the invention forms for example a gas sensor, to measure a concentration of a predetermined gas.

In an alternative, the sensor makes it possible to identify a gas present in the cavity, from the values of wavelengths absorbed in the cavity.

The sensor according to the invention enables a concentration measurement in a gaseous medium, or in a liquid medium.

The concentration measurement is advantageously based on Beer-Lambert's law.

In an alternative, it is possible to measure a concentration of particles, the light scattered by the particles being deviated from its trajectory inside the absorption cavity. Although the phenomenon brought into play is scattering, and not absorption, this also results in a variation in light intensity between the analysis beam injected into the absorption cavity and the beam extracted by the extraction waveguide.

The invention claimed is:

1. An optical device for a chemical or biological sensor, comprising:
   an absorption cavity including reflective inner walls and configured to receive a chemical or biological medium;
   an injection waveguide, extending outside the absorption cavity and configured to inject an analysis light beam inside the absorption cavity; and
   an extraction waveguide, extending outside the absorption cavity and configured to extract a measurement light beam, coming from inside the absorption cavity and corresponding to the analysis light beam having transited through the absorption cavity; wherein
   the absorption cavity has a shape of a right cylinder, wherein a shape of a base of the right cylinder is part of an ellipse, one end of the injection waveguide is arranged at a first focus of the ellipse and one end of the extraction waveguide is arranged at a second focus of the ellipse, and
   a core of the injection waveguide and a core of the extraction waveguide each include a tip shaped section protruding outside of a cladding of the injection waveguide and a cladding of the extraction waveguide, respectively, the tip shaped section having a decreasing cross-sectional area as a function of distance from the one end of the extraction waveguide and the injection waveguide, respectively.

2. The device according to claim 1, wherein the injection waveguide and the extraction waveguide each include:
   the cladding, including a slimmed end, on a side of the absorption cavity;
   the core, including the tip shaped section, on the side of the absorption cavity, which protrudes outside of the cladding; and
   an adaptation region surrounding the slimmed end of the cladding and the tip shaped section of the core.

3. The device according to claim 2, wherein each adaptation region is formed by at least one secondary cavity, open to the absorption cavity.

4. The device according to claim 1, wherein a central axis of the injection waveguide and a central axis of the extraction waveguide each extend in a straight line, each inclined by a respective non-zero angle relative to a symmetry plane of the absorption cavity.

5. An optical device for a chemical or biological sensor, comprising:
   an absorption cavity including reflective inner walls and configured to receive a chemical or biological medium;
   an injection waveguide, extending outside the absorption cavity and configured to inject an analysis light beam inside the absorption cavity; and
   an extraction waveguide, extending outside the absorption cavity and configured to extract a measurement light beam, coming from inside the absorption cavity and corresponding to the analysis light beam having transited through the absorption cavity; wherein
   the absorption cavity has a shape of a right cylinder, wherein a shape of a base of the right cylinder is part of an ellipse, one end of the injection waveguide is arranged at a first focus of the ellipse and one end of the extraction waveguide is arranged at a second focus of the ellipse,
   a core of the injection waveguide and a core of the extraction waveguide each include a tip shaped section having a decreasing cross-sectional area as a function of distance from the one end of the extraction waveguide and the injection waveguide, respectively, and each respective non-zero angle $\theta_i$ is substantially equal in absolute value to:

$$\theta_i = \sin^{-1}\left(\frac{n_c * \Delta x}{n_i * \sqrt{\Delta x^2 + b^2}}\right)$$

with:

$n_c$ a refractive index inside the absorption cavity;

$n_i$ an effective index of a guided mode in the injection waveguide at the one end of the injection waveguide, respectively an effective index of a guided mode in the extraction waveguide at the one end of the extraction waveguide;

$\Delta x$ a distance between a center of the injection waveguide, at the one end of the injection waveguide, and a center of the ellipse, respectively a distance between a center of the extraction waveguide, at the one end of the extraction waveguide, and the center of the ellipse; and b a distance between the center of the ellipse and a bottom of the absorption cavity, on a side opposite to the injection and extraction waveguides.

6. The device according to claim 1, wherein the injection waveguide and the extraction waveguide are symmetrical with each other, relative to a symmetry plane of the absorption cavity.

7. The device according to claim 1, wherein a distance between respective centers of the injection waveguide and the extraction waveguide, at respective ends of the injection waveguide and the extraction waveguide situated on a side of the absorption cavity, is greater than 5 μm.

8. The device according to claim 1, wherein dimensions and refractive indices of the injection waveguide and the extraction waveguide, and a distance between respective centers of the injection waveguide and the extraction waveguide, at respective ends of the injection waveguide and the extraction waveguide situated on a side of the absorption cavity, are adapted so that a guided mode at an exit of the injection waveguide does not interfere with a guided mode at an entrance of the extraction waveguide.

9. The device according to claim 1, wherein the injection waveguide and the extraction waveguide are connected together by a loopback waveguide, the injection waveguide, the extraction waveguide and the loopback waveguide being formed together in a single piece.

10. The device according to claim 9, further comprising a main waveguide, extending parallel to a tangent to the loopback waveguide, for transfer of the analysis light beam from the main waveguide to the loopback waveguide, and transfer of the measurement light beam from the loopback waveguide to the main waveguide, by evanescent coupling.

11. The device according to claim 9, wherein the loopback waveguide extends to a rear of the absorption cavity, on a side opposite to a side receiving the respective ends of the injection waveguide and the extraction waveguide.

12. A chemical or biological sensor, comprising:
the optical device according to claim 1;
a light source, for emission of the analysis light beam; and
a photo-detector, for reception of the measurement light beam.

13. The device according to claim 1, wherein the core of the injection waveguide and the core of the extraction waveguide each have a constant height in planes parallel to a generatrix of the right cylinder and the tip shaped section in planes parallel to the base of the right cylinder.

14. The optical device according to claim 5, wherein
the injection waveguide and the extraction waveguide are symmetrical with each other, relative to a symmetry plane of the absorption cavity.

* * * * *